(12) United States Patent
Imano et al.

(10) Patent No.: US 8,131,331 B2
(45) Date of Patent: Mar. 6, 2012

(54) PORTABLE AND FOLDABLE RADIO TERMINAL WITH MULTIPLE FREQUENCY ANTENNA

(75) Inventors: Daigo Imano, Miyagi (JP); Hironori Kikuchi, Miyagi (JP); Kenichi Sato, Miyagi (JP); Yasuhiro Kitajima, Kanagawa (JP); Nobuhiro Iwai, Kanagawa (JP); Tatsuya Sano, Tokyo (JP)

(73) Assignee: Panasonic Corporation, Osaka (JP)

( * ) Notice: Subject to any disclaimer, the term of this patent is extended or adjusted under 35 U.S.C. 154(b) by 63 days.

(21) Appl. No.: 12/812,441

(22) PCT Filed: Dec. 24, 2008

(86) PCT No.: PCT/JP2008/003930
§ 371 (c)(1),
(2), (4) Date: Jul. 9, 2010

(87) PCT Pub. No.: WO2009/087732
PCT Pub. Date: Jul. 16, 2009

(65) Prior Publication Data
US 2010/0279747 A1    Nov. 4, 2010

(30) Foreign Application Priority Data
Jan. 10, 2008   (JP) ................................. 2008-003185

(51) Int. Cl.
*H04M 1/00*    (2006.01)
(52) U.S. Cl. ............... 455/575.7; 455/550.1; 455/562.1; 455/575.1

(58) Field of Classification Search ................. 455/90.3, 455/63.4, 82–83, 87, 107, 129, 550.1, 562.1, 455/575.1, 575.3, 575.8; 343/702, 745, 749, 343/822–824, 852, 860–861, 900, 913
See application file for complete search history.

(56) References Cited

U.S. PATENT DOCUMENTS

| 5,335,368 A | 8/1994 | Tamura | |
|---|---|---|---|
| 6,229,489 B1 * | 5/2001 | Holshouser et al. | .......... 343/702 |

(Continued)

FOREIGN PATENT DOCUMENTS

JP    4354425 A    12/1992
(Continued)

OTHER PUBLICATIONS

International Search Report relating to International Application No. PCT/JP2008/003930, mailed Apr. 7, 2009, 4 pages.

*Primary Examiner* — Meless Zewdu
(74) *Attorney, Agent, or Firm* — Seed IP Law Group PLLC

(57) ABSTRACT

A foldable portable radio device adapted to a plurality of frequency bands has a good antenna performance in all the use frequency bands even in both open and folded states. In the foldable portable radio device, a control section (24) controls switching means (20) to connect a sub-matching circuit (19) and a first circuit element (21) when a first use frequency band is used and further when the foldable portable radio device is in the open state and to connect the sub-matching circuit (19) and a second circuit element (22) when a first use frequency band is used and further when the foldable portable radio device is in the closed state, or when a second use frequency band is used irrespective of the open/closed state of the foldable portable radio device.

9 Claims, 6 Drawing Sheets

U.S. PATENT DOCUMENTS

| | | | |
|---|---|---|---|
| 6,272,356 B1* | 8/2001 | Dolman et al. | 455/575.3 |
| 6,765,536 B2* | 7/2004 | Phillips et al. | 343/702 |
| 6,862,432 B1* | 3/2005 | Kim | 455/80 |
| 7,196,672 B2* | 3/2007 | Iwai et al. | 343/702 |
| 2002/0169010 A1 | 11/2002 | Shoji et al. | |
| 2005/0024288 A1* | 2/2005 | Saito | 343/860 |
| 2005/0243000 A1* | 11/2005 | Hwang et al. | 343/702 |
| 2005/0277387 A1* | 12/2005 | Kojima et al. | 455/78 |
| 2007/0229383 A1* | 10/2007 | Koyanagi et al. | 343/900 |
| 2008/0101297 A1* | 5/2008 | Szini et al. | 370/332 |
| 2008/0106477 A1* | 5/2008 | Mashima et al. | 343/702 |
| 2010/0134366 A1* | 6/2010 | Yu | 343/742 |

FOREIGN PATENT DOCUMENTS

| | | |
|---|---|---|
| JP | 2002335180 A | 11/2002 |
| JP | 2002353716 A | 12/2002 |
| JP | 2004015307 A | 1/2004 |
| JP | 2004-180209 A | 6/2004 |
| JP | 2005-151051 A | 6/2005 |
| JP | 2007-158718 A | 6/2007 |

* cited by examiner

|  | STATES OF FOLDING PORTABLE RADIO TERMINAL ||
|  | OPEN STATE | CLOSED STATE |
| --- | --- | --- |
| FIRST FREQUENCY BAND | FIRST CIRCUIT ELEMENT 21 | SECOND CIRCUIT ELEMENT 22 |
| SECOND FREQUENCY BAND | SECOND CIRCUIT ELEMENT 22 ||
FIG.8
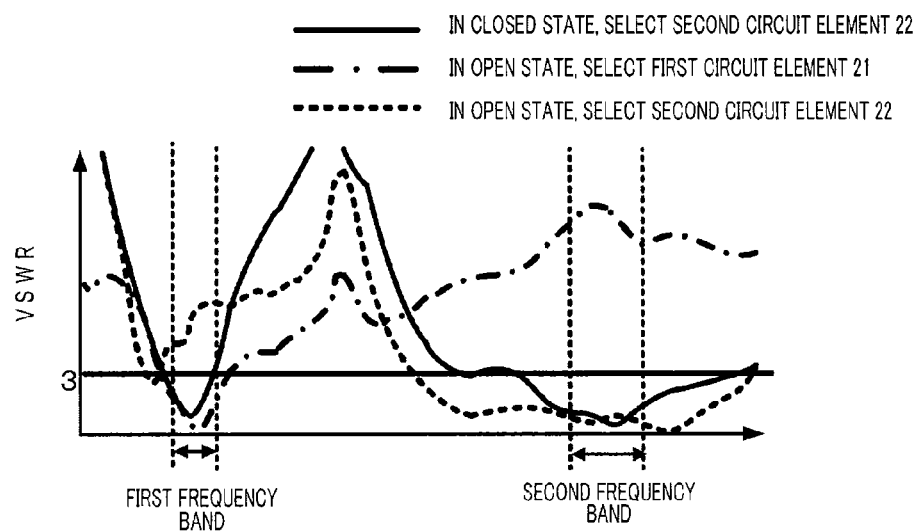
FIG.9
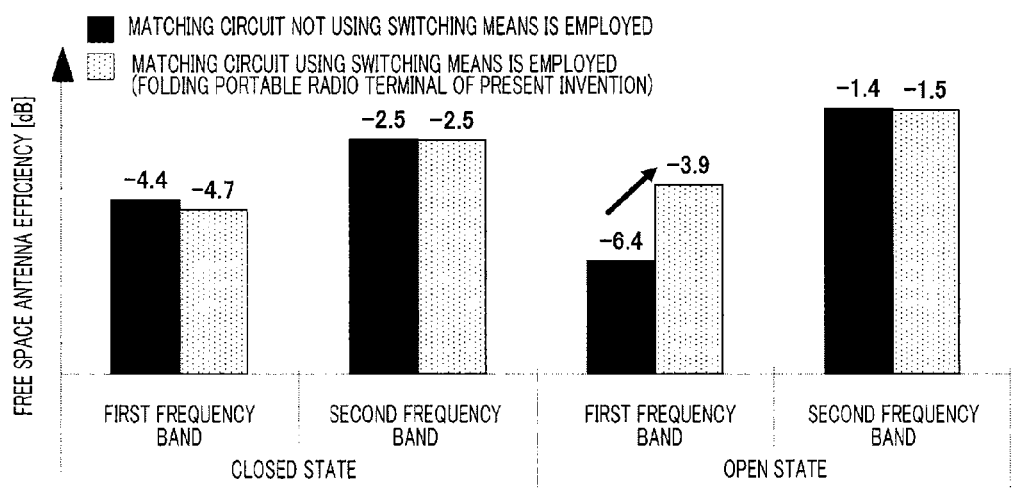
FIG.10

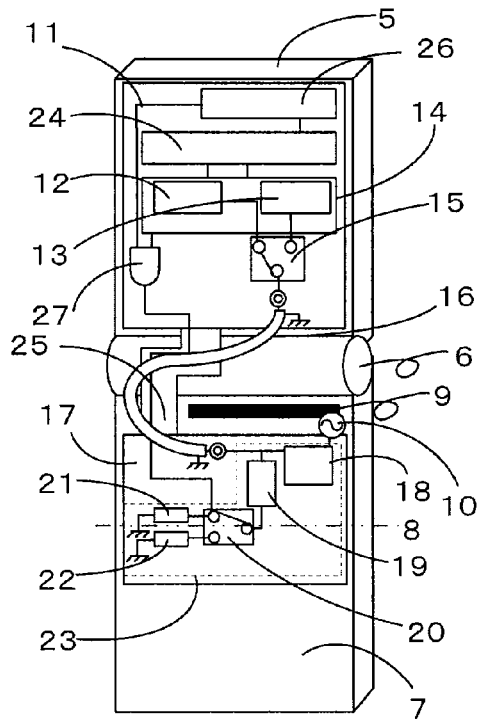

FIG.11

| FREQUENCY BAND | OPEN/CLOSED STATE | AND CIRCUIT 26 | | OUTPUT SIGNAL |
|---|---|---|---|---|
| | | INPUT SIGNAL | | |
| | | FREQUENCY BAND SELECTION SIGNAL | OPEN/CLOSE DETECTION SIGNAL | |
| FIRST FREQUENCY BAND | OPEN STATE | H | H | H |
| | CLOSED STATE | | L | L |
| SECOND FREQUENCY BAND | OPEN STATE | L | H | L |
| | CLOSED STATE | | L | L |

FIG.12

| FREQUENCY BAND | OPEN/CLOSED STATE | AND CIRCUIT 26 OUTPUT SIGNAL | CIRCUIT ELEMENT CONNECTED WITH SWITCHING MEANS 20 |
|---|---|---|---|
| FIRST FREQUENCY BAND | OPEN STATE | H | FIRST CIRCUIT ELEMENT 21 |
| | CLOSED STATE | L | SECOND CIRCUIT ELEMENT 22 |
| SECOND FREQUENCY BAND | OPEN STATE | L | |
| | CLOSED STATE | L | |

FIG.13

PORTABLE AND FOLDABLE RADIO TERMINAL WITH MULTIPLE FREQUENCY ANTENNA

TECHNICAL FIELD

The present invention relates to a folding portable radio terminal that supports a plurality of frequency bands.

BACKGROUND ART

In Recent years, with portable radio terminal, folding models have become the mainstream, and, in addition, there is an increasing demand for thinner models. Moreover, portable radio terminal that support a plurality of frequency bands and portable radio terminals that support a plurality of communication systems, such as GSM system and W-CDMA system are becoming the main stream.

FIG. 1 is an overall view of a conventional folding portable radio terminal. In the folding portable radio terminal shown in FIG. 1, first housing 28 and second housing 29 are openly and closely coupled via hinge section 30. First circuit board 31 is set in the first housing 28, and antenna element 32 that resonates in a plurality of frequency bands and second circuit board 33 are set in second housing 29. In addition, radio section 34, power feeding section 35 that feeds power from radio section 34 to antenna element 32 and matching circuit section 36 that matches antenna element 32 and radio section 34 are set on second circuit board 33. Moreover, first circuit board 31 and second circuit board 33 are connected via flexible cable 37.

FIG. 2 shows VSWR (Voltage Standing Wave Ratio) of antenna element 32 in the folding portable radio terminal shown in FIG. 1 in the closed state and the open state. As shown in FIG. 2, in the closed state (the solid lines in FIG. 2), the frequency bands with VSWR equal to or lower than the threshold "3" are assured for both the first and second frequency bands. However, in the open state (the dashed lines in FIG. 2), since the length of the housing varies from the closed state and a metal body such as first circuit board 31 comes close to the antenna element, the resonance frequency having been adjusted to the lowest frequency band (first frequency band) in the closed state shifts to a lower frequency, so that the antenna gain in the desired frequency band drops.

Technologies to solve this problem are disclosed, for example, in patent documents 1 and 2. FIG. 3 is a drawing showing a conventional variable antenna matching circuit described in patent document 1. The conventional variable antenna matching circuit shown in FIG. 3 is set with impedance matching circuit 40 between antenna 38 and transmitting/receiving radio circuit 39. Capacitance element 41 and switch 42 are set in impedance matching circuit 40. Switch 42 switches between connection and disconnection of capacitance element 41 and antenna 38 based on output signals from shape detecting circuit 43 that detects shape change of the portable radio terminal.

This allows impedance matching for an antenna's impedance, which varies depending on the shape of a portable radio terminal.

FIG. 4 is a block diagram showing a circuit configuration of a variable capacity matching circuit in the conventional portable radio terminal described in patent document 2. Moreover, FIG. 5 is a drawing showing a state in which the open state and the closed state of the main body and the display section change. In the conventional portable radio terminal shown in FIG. 4, matching circuit section 48 composed of fixed capacitance 46 and variable capacitance 47 matches the impedance in helical antenna element 44 and the impedance in transmitting/receiving circuit 45. Variable capacitance 47 varies due to continuous change in opening angle α between the helical antenna element and the display section in FIG. 5.

Patent Document 1: Japanese Patent Application Laid-Open No. 2004-15307 (page 5, FIG. 2)
Patent Document 2: Japanese Patent Application Laid-Open No. 2002-353716 (page 11, FIG. 6 and FIG. 8)

DISCLOSURE OF INVENTION

Problems to be Solved by the Invention

However, the above-described conventional portable radio terminal has a problem that if the antenna element is adapted to a plurality of frequency bands, impedance matching is possible in one frequency band but is not possible in the other frequency band due to the influence of connection and disconnection of the capacitance element, so that it is not possible to assure good antenna characteristics in all frequency bands.

It is therefore an object of the present invention to provide a folding portable radio terminal that is able to assure good antenna performance in a plurality of frequency bands in both its closed and open states.

Means for Solving the Problem

The portable radio terminal according to the present invention adopts a configuration including: a first housing having a conductive component; a second housing pivotably coupled with the first housing through a hinge section; an antenna that supports a first frequency and a second frequency higher than the first frequency; a radio section having a first radio circuit that operates at the first frequency and a second radio circuit that operates at the second frequency; an open/close detecting section that detects whether the first housing and the second housing are in a closed state in which the first housing and the second housing overlap or in an open state in which the first housing and the second housing do not overlap; a matching circuit section that is connected with the radio section, has a first matching state and a second matching state and connects with the antenna; and a control section that places the matching circuit section in the first matching state in a case of the closed state, or in a case of the open state and use of the second frequency, and places the matching circuit section in the second matching state in a case of the open state and use of the first frequency.

ADVANTAGEOUS EFFECTS OF INVENTION

According to the present invention, since the configuration of the matching circuit is switched in only the lowest frequency band in the open state, it is possible to assure good antenna performance in a plurality of frequency bands in both open and closed states, and also it is possible to assure good antenna performance when the body of a radio terminal is made thinner.

DETAILED DESCRIPTION OF DRAWINGS

FIG. 1 is a configuration diagram of a conventional folding portable radio terminal;
FIG. 2 is a drawing showing VSWR characteristics regarding the conventional folding portable radio terminal;
FIG. 3 is a drawing showing a configuration of a conventional variable antenna matching circuit;

FIG. 8 is a drawing showing criteria for circuit element selection of a switching means in the folding portable radio terminal according to embodiment 1 of the present invention;

FIG. 9 is a drawing showing VSWR characteristics of an antenna according to embodiment 1 of the present invention;

FIG. 10 is a drawing showing antenna gains depending on whether or not a switching means is used in the folding portable radio terminal according to embodiment 1 of the present invention;

FIG. 11 is an internal configuration diagram of a folding portable radio terminal according to embodiment 2 of the present invention;

FIG. 12 is a drawing showing input/output signals of an AND circuit in the folding portable radio terminal according to embodiment 2 of the present invention; and FIG. 13 is a drawing showing criteria for circuit element selection of the switching means in accordance with output signals from the AND circuit in the folding portable radio terminal according to embodiment 2 of the present invention.

BEST MODE FOR CARRYING OUT THE INVENTION

Now, embodiments of the present invention will be described in detail with reference to the accompanying drawings.

(Embodiment 1)

Figure 1:
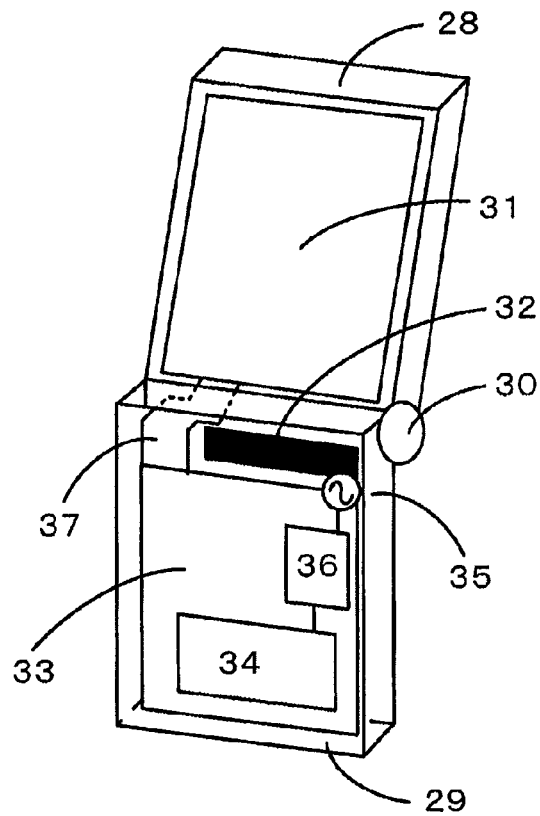
Figure 2:
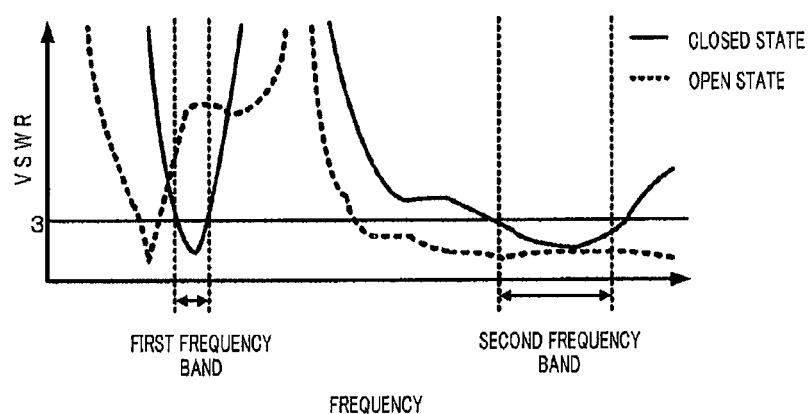
Figure 3:
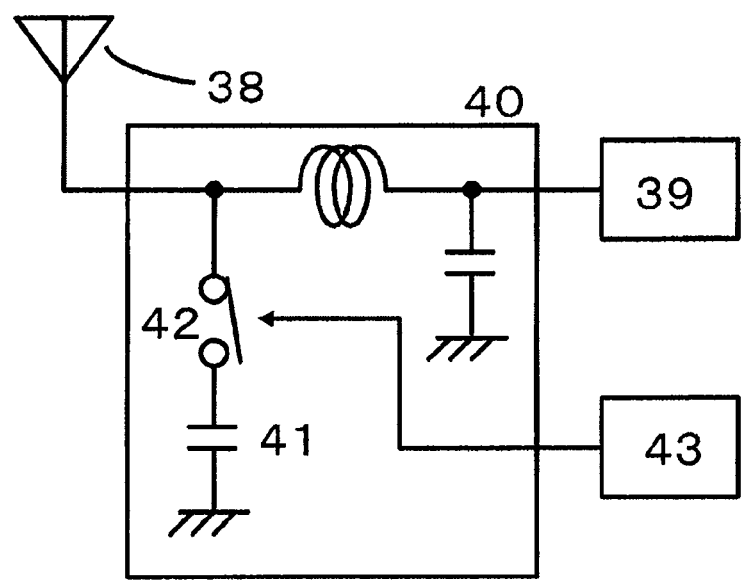
Figure 4:
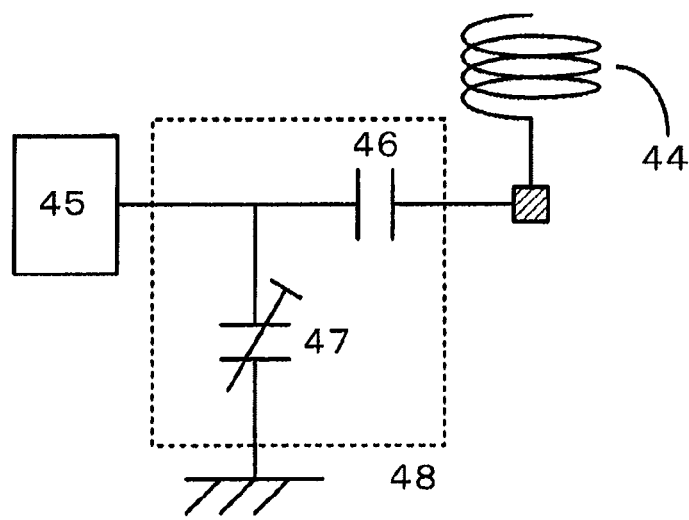
FIG. 4 is a block diagram showing a circuit configuration of a variable capacity matching circuit in the conventional folding portable radio terminal.
Figure 5:
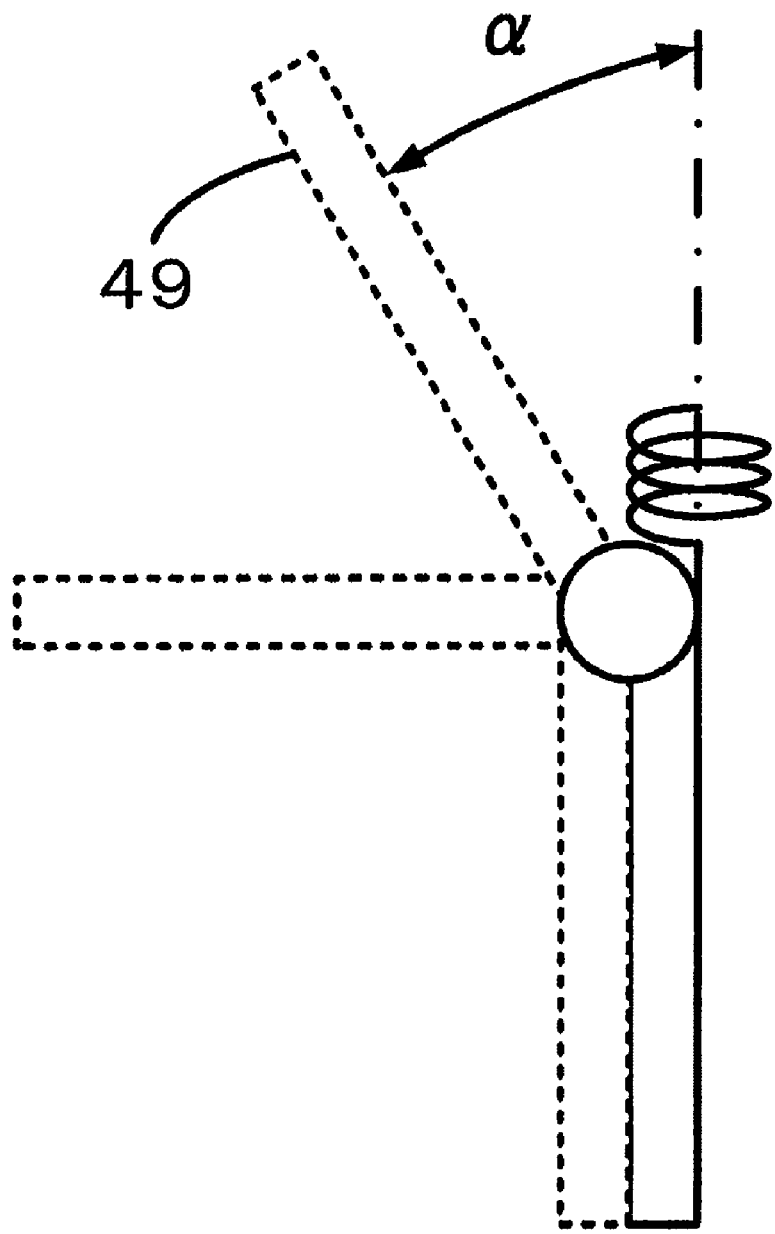
FIG. 5 is a drawing showing a state in which the open state and the closed state of the main body and the display section in the conventional folding portable radio terminal are changed.
Figure 6:
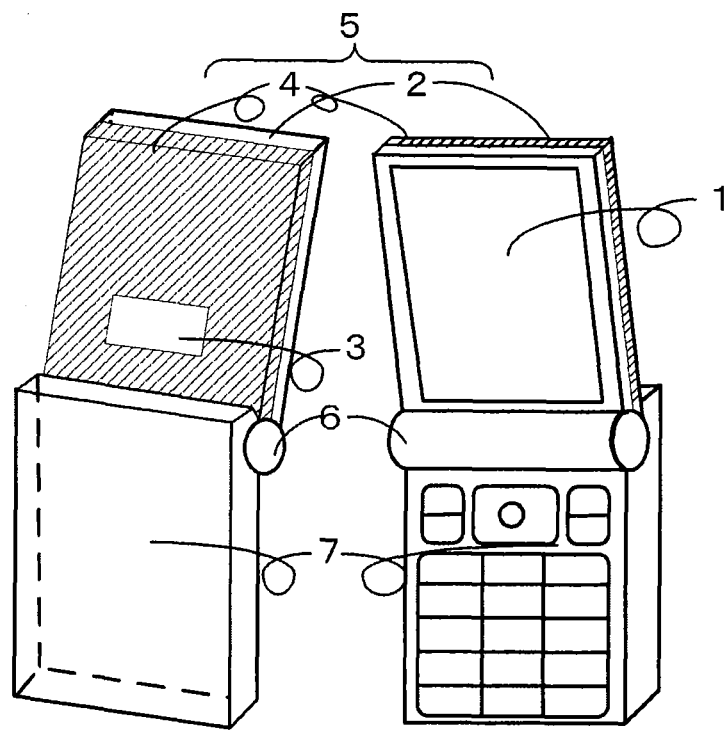
FIG. 6 is an overview diagram of a folding portable radio terminal according to embodiment 1 of the present invention.

FIG. 6 is an overview diagram of a folding portable radio terminal according to embodiment 1 of the present invention. The folding portable radio terminal shown in FIG. 6 has: upper housing 5 composed of first housing 2 having the main display section 1 side made of a dielectric material and second housing 4 having sub-display section 3 made of a metal material; hinge section 6; and lower housing 7 made of a dielectric material. Upper housing 5 and lower housing 7 are pivotably coupled through hinge section 6. Here, in the following descriptions, the state in which the folding portable radio terminal is folded such that upper housing 5 and lower housing 7 overlap not to expose main display section 1 will be referred to as "closed state", and, on the other hand, the state in which main display section 1 is exposed as shown in FIG. 6 will be referred to as "open state".

Figure 7:
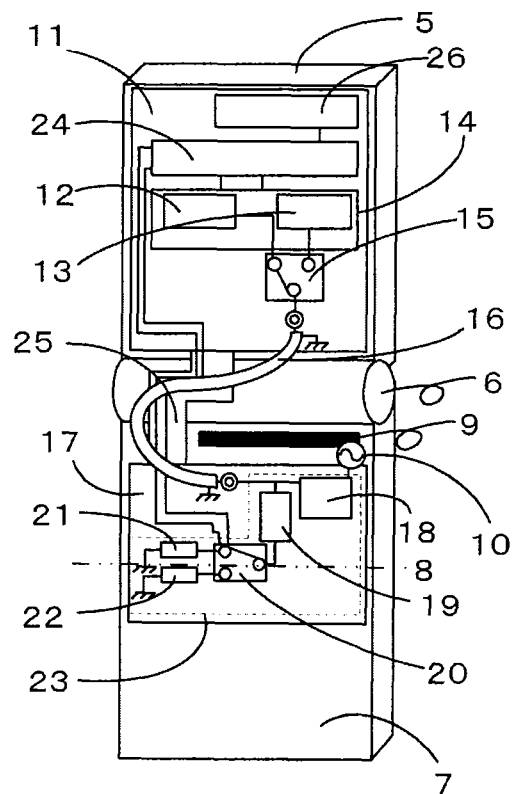
FIG. 7 is an internal configuration diagram of the folding portable radio terminal according to embodiment 1 of the present invention.

FIG. 7 is an internal configuration diagram of the folding portable radio terminal shown in FIG. 6. Inside lower housing 7, antenna element 9 is placed closer to the hinge section 6 side than center line 8 in the longitudinal direction. The element length of antenna element 9 is determined to support the first frequency band and the second frequency band higher than the first frequency band in the closed state.

Here, "frequencies supported by the antenna element" in this case means frequencies at which the radio circuit connected to the antenna element operates. By using an antenna element supporting certain frequencies and a radio circuit operating at these frequencies, it is possible to receive signals through radio waves from base stations at the antenna element and obtain desired electrical signals in the radio circuit, and it is possible to radiate electrical signals from the radio circuit as radio waves at the antenna element.

There are radio section 14 composed of first radio circuit 12 and second radio circuit 13, and radio section switching means 15 on first circuit board 11 in upper housing 5. In addition, there is matching circuit section 23 composed of main matching circuit 18, sub-matching circuit 19, switching means 20, first circuit element 21 and second circuit element 22 on second circuit board 17 in lower housing 7. Moreover, there are control section 24 and open/close detecting means 26 inside upper housing 5. First circuit board 11 and second circuit board 17 are connected via flexible cable 25.

First radio circuit 12 operates in the first frequency band. Second radio circuit 13 operates in the second frequency band. Here, "operation" in this case means performing transmission/reception processing of signals such as voice signals.

Radio section switching means 15 selects either first radio circuit 12 or second radio circuit 13 based on the first control signal outputted from control section 24 and connects the selected circuit and coaxial cable 16. Radio section switching means 15 connects, via coaxial cable 16, with power feeding section 10 that feeds power to antenna element 9.

Impedances of antenna element 9, radio section 14 and radio section switching means 15 are matched using matching circuit section 23. Sub-matching circuit 19 connects with one end of main matching circuit 18. Switching means 20 connects one end of sub-matching circuit 19 to first circuit element 21 or second circuit element 22 based on the control signal outputted from control section 24. First circuit element 21 connects with the ground of second circuit board 17. Second circuit element 22 connects with the ground of second circuit board 17.

The constant for first circuit element 21 is determined to make the impedance in the switching means 20 side seen from sub-matching circuit 19 zero. In addition, the constant for second circuit element is determined to make the impedance in the switching means 20 side seen from sub-matching circuit 19 infinite. By this means, sub-matching circuit 19 operates only when connecting with first circuit element 21, and does not operate when connecting with second circuit element 22.

Control section 24 selects the frequency band to use based on information transmitted from the base station system and outputs the first control signal representing the selection result to radio switching means 15. For example, when the power supply is turned on, control section 24 operates first radio circuit 12 and second radio circuit 13 individually, searches for a base station to communicate with, and selects the same frequency band as the frequency band used in the searched base station system based on information transmitted from the base station system. In addition, in a state in which the first frequency band is used in standby, when the power of signals received from the base station system becomes lower, and handover to a neighboring base station system is performed, and then information indicating that the second frequency band is used is transmitted from the neighboring base station, control section 24 selects the second frequency band.

Open/close detecting means 26 detects whether the folding portable radio terminal is in the open state or in the closed state, generates an open/close detection signal representing the detection result and outputs the signal to control section 24. As an open/closed state detection method, a method is used as an example where open/close detecting means 26 measures the flux density of the magnet (not shown) in lower housing 7 in the closed state and detects whether the folding portable radio terminal is in the open state or in the closed state based on the measurement result. In this case, when the flux density of the magnet is higher than a predetermined threshold, the open/close detecting means 26 can detect that the magnet is close and the folding portable radio terminal is in the closed state. On the other hand, when the flux density of the magnet is lower than a predetermined threshold, the open/close detecting means 26 can detect that the magnet is far and the folding portable radio terminal is in the open state.

Control section 24 generates the second control signal to switching means 20 based on the open/close detection signal outputted from open/close detecting means 26 and information transmitted from the base station system. The second control signal outputted from control section 24 is inputted to switching means 20 via the flexible cable connecting first circuit board 11 and second circuit board 17.

FIG. 8 is a drawing showing criteria for circuit element selection of switching means 20. As shown in FIG. 8, when the first frequency band is employed and the folding portable radio terminal is in the open state, control section 24 controls switching means 20 to connect sub-matching circuit 19 and first circuit element 21. On the other hand, when the first frequency band is employed and the folding portable radio terminal is in the closed state, or when the second frequency band is employed regardless whether the folding portable radio terminal is in the open state or in the closed state, control section 24 controls switching means 20 to connect sub-matching circuit 19 and second circuit element 22.

FIG. 9 is a drawing showing VSWR characteristics of the folding portable radio terminal according to the present embodiment, and FIG. 10 is a drawing showing antenna gains based on whether or not a switching means is used in the folding portable radio terminal according to the present embodiment.

As shown in FIG. 9, VSWR characteristics of the folding portable radio terminal according to the present embodiment are as follows: when the folding portable radio terminal is in the closed state and second circuit element 22 is selected (the solid line in FIG. 9), VSWR are equal to or lower than the threshold "3" in both the first frequency band and the second frequency band; when the folding portable radio terminal is in the open state and first circuit element 21 is selected (the alternate long and short dash line in FIG. 9), VSWR is equal to or lower than the threshold "3" in the first frequency band; and when the folding portable radio terminal is in the open state and second circuit element 22 is selected (the dashed line in FIG. 9), VSWR is equal to or lower than the threshold "3" in the second frequency band. Therefore, VSWR characteristics are good in both open and closed states in all frequency bands.

In addition, as shown in FIG. 10, for an antenna efficiency in a free space, it is possible to obtain a good characteristic in the open state in the first frequency band compared to a case in which switching means 20 is not used.

As described above, according to the present embodiment, since the configuration of the matching circuit is switched in only the lowest frequency band when the folding portable radio terminal is in the open state, it is possible to assure good antenna performance in a plurality of frequency bands in both open and closed states, and also it is possible to assure good antenna performance when the body of a radio terminal body is made thinner.

(Embodiment 2)

Next, embodiment 2 according to the present invention will be explained. FIG. 11 is an internal configuration diagram of a folding portable radio terminal according to embodiment 2 of the present invention. Here, in FIG. 11, the same parts as in FIG. 7 explained with the above-described embodiment 1 will be assigned the same reference numerals and descriptions will be omitted.

In the folding portable radio terminal shown in FIG. 11, open/close detection signals outputted from open/close detecting means 26 and frequency band selection signals representing frequency bands used by radio section 14 are inputted to AND circuit 27, and switching means 20 is controlled by output signals from AND circuit 27.

FIG. 12 is a drawing showing input/output signals of the AND circuit in the folding portable radio terminal according to the present embodiment. As shown in FIG. 12, in the open state, high signals (or "H signals") are inputted from open/close detecting means 26 to AND circuit 27, and in the closed state, low signals (or "L signals") are inputted from open/close detecting means 26 to AND circuit 27. In addition, when radio section 14 operates in the first frequency band, H signals are inputted from radio section 14 to AND circuit 27, and, when radio section 14 operates in the second frequency band, L signals are inputted from radio section 14 to AND circuit 27. As a result of this, as shown in FIG. 12, when the folding portable radio terminal is in the open state and radio section 14 operates in the first frequency band, H signals are outputted from AND circuit 27. On the other hand, when radio section 14 operates in the first frequency band and the folding portable radio terminal is in the closed state, or radio section 14 operates in the second frequency band regardless whether the folding portable radio terminal is in the open state or in the closed state, L signals are outputted.

FIG. 13 is a drawing showing criteria for circuit element selection of switching means 20 in accordance with output signals from AND circuit in the folding portable radio terminal according to the present embodiment. As shown in FIG. 13, when an output signal is H signal, switching means 20 connects sub-matching circuit 19 with first circuit element 21, and, when an output signal is L signal, switching means 20 connects sub-matching circuit 19 with second circuit element 22.

As described above, according to the present embodiment, VSWR characteristics and an antenna efficiency in a free space exhibit the same performance as for the folding portable radio terminal according to embodiment 1 of the present invention, and therefore, it is possible to obtain good antenna performance in all frequency bands in both open and closed states.

Here, with each above-described embodiment, although in cases have been explained where a metal material is used in part of the upper housing, the present invention is not limited to this, and it is possible to obtain the same effect even if the entire upper housing is made of metal materials. Moreover, even if the entire housing is made of dielectric materials, it is possible to obtain the same effect by providing a conductive member (e.g. a circuit board having a conductive layer) inside the upper housing. In the same way, with each above-described embodiment, although a dielectric material is used in the lower housing, the present invention is not limited to this, and it is possible to obtain the same effect by embedding a conductive plate in an dielectric material or forming part of the lower housing by a metal material.

In addition, with each above-described embodiment, although constants for the first circuit element and the second circuit element are determined such that the impedance in the switching means side seen from the sub-matching circuit is zero or infinite, the present invention is not limited to this, and it is possible to obtain the same effect by determining the constants so as to improve an antenna efficiency in a free space.

Moreover, according to the present invention, it is possible to use a circuit as a switching means such as a PIN diode to select connection and disconnection between the sub-matching circuit and one circuit element.

Moreover, with each above-described embodiment, although a case has been explained where antenna element 9 is provided in lower housing 7, the present invention is not limited to this, and it is possible to obtain the same effect when antenna 9 is provided outside the housing like a helical antenna.

Moreover, with each above-described embodiment, although a coaxial cable is used from radio section 14 in upper housing 5 to power supply section 10 in lower housing 7, the present invention is not limited to this, and it is possible to obtain the same effect by providing a transmission line inside a flexible cable.

Furthermore, even if open/close detection signals and frequency band selection signals from the radio section are opposite to each above-described embodiment, it is possible to obtain the same effect by changing operating conditions of the switching means, or changing the AND circuit to a different logical circuit.

Furthermore, with each above-described embodiment, although cases have been explained where radio section 14, control section 24 and open/close detecting means 26 are provided in upper housing 5, the present invention is not limited to this, and it is possible to obtain the same effect by providing these in lower housing 7.

The disclosure of Japanese Patent Application No. 2008-003185, filed on Jan. 10, 2008, including the specification, drawings and abstract, is incorporated herein by reference in its entirety.

Industrial Applicability

The present invention provides an advantage of assuring good antenna performance in a plurality of frequency bands in both open and closed states, and is applicable to folding portable radio terminals using metal housings and so forth for thinner models with improved rigidity.

The invention claimed is:

1. A portable radio terminal comprising:
    a first housing having a conductive component;
    a second housing pivotally coupled with the first housing through a hinge section;
    an antenna that supports a first frequency and a second frequency higher than the first frequency;
    a radio section having a first radio circuit that operates at the first frequency and a second radio circuit that operates at the second frequency;
    an open/close detecting section that detects whether the first housing and the second housing are in a closed state in which the first housing and the second housing overlap or in an open state in which the first housing and the second housing do not overlap;
    a matching circuit section that is connected with the radio section, has a first matching state and a second matching state and connects with the antenna; and
    a control section that places the matching circuit section in the first matching state in a case of the closed state, or in a case of the open state and use of the second frequency, and places the matching circuit section in the second matching state in a case of the open state and use of the first frequency.

2. The portable radio terminal according to claim 1, wherein the antenna is placed closer to the hinge section side than a center line in a longitudinal direction in the second housing.

3. The portable radio terminal according to claim 1, wherein the matching circuit section includes:
    a circuit board having a ground;
    a main matching circuit placed on the circuit board;
    a sub-matching circuit placed on the circuit board; and
    a switching section that switches between a first connecting state in which the sub-matching circuit and the ground are connected and a second connecting state in which the sub-matching circuit and the ground are not connected,
    wherein the control section controls the switching section to make the first connecting state when providing the first matching state, and controls the switching section to make the second connecting state when providing the second matching state.

4. The portable radio terminal according to claim 3, wherein the switching section connects with the ground on the circuit board via a circuit element.

5. The portable radio terminal according to claim 3, wherein the sub-matching circuit is provided between the antenna and a transmission line that connects the radio section supporting the first frequency and the second frequency.

6. The portable radio terminal according to claim 1, wherein the radio section is provided in the first housing.

7. The portable radio terminal according to claim 1, wherein the conductive member of the first housing is made of metal.

8. The portable radio terminal according to claim 1, wherein the second housing is made of an dielectric material.

9. A portable radio terminal comprising:
    a first housing having a display section and a conductive member;
    a second housing pivotably coupled with the first housing through a hinge section;
    an antenna that supports a first frequency and a second frequency higher than the first frequency;
    a radio section having a first radio circuit that operates at the first frequency and a second radio circuit that operates at the second frequency;
    an open/close detecting section that detects whether the first housing and the second housing are in a closed state in which the first housing and the second housing are folded to overlap each other not to expose the display section, or in an open state in which the display section is exposed;
    a matching circuit section that is connected to the radio section, has a first matching state and a second matching state and connects with the antenna; and
    a control section that places the matching circuit section in the first matching state in a case of the closed state or in a case of the open state and use of the second frequency, and places the matching circuit section in the second matching state in a case of the open state and use of the first frequency.

* * * * *